United States Patent [19]
Dragone

[11] Patent Number: 6,079,691
[45] Date of Patent: Jun. 27, 2000

[54] PINCH VALVE ASSEMBLY

[76] Inventor: Rocco V. Dragone, 183 Renner Ave., Union, N.J. 07083

[21] Appl. No.: 09/067,192

[22] Filed: Apr. 27, 1998

Related U.S. Application Data

[63] Continuation of application No. 08/820,477, Mar. 18, 1997, abandoned.

[51] Int. Cl.[7] ..................................................... F16K 7/04
[52] U.S. Cl. .................................................. 251/7; 251/4
[58] Field of Search ............................................ 251/4, 7

[56] References Cited

U.S. PATENT DOCUMENTS

| | | | |
|---|---|---|---|
| 3,823,724 | 7/1974 | Davis | 137/15 |
| 4,230,151 | 10/1980 | Jonsson | 137/595 |
| 5,190,071 | 3/1993 | Sule | 137/595 |

*Primary Examiner*—John Fox

[57] ABSTRACT

The improved pinch valve assembly (10) functions to control the flow of fluids on a fluid system. The improved pinch valve assembly (10) controls plurality of fluid containing tubing (16). When the solenoid coil (22) is energized the plunger (28), which is securely attached to the shaft (31) which has a first pin (18A) and a second pin (18B) securely attached perpendicular to the longitudinal axis of the shaft (31), moves forward. The forward motion of the shaft (31) causes the first pin (18A) to decompress the first tubing (16A) and the third tubing (16C) permitting fluid to flow therethrough. The forward motion of the shaft (31) further causes the second pin (18B) to also move forward compressing the second tubing (16B) and the fourth tubing (16D) stopping fluid flow. The forward motion of the shaft (31) still further causes the third pin (18C) to compress the helical spring (13). When the solenoid coil (22) is de-energized the plunger (28), which is securely attached to the shaft (31) which has the first pin (18A) and the second pin (18B) securely attached perpendicular to the longitudinal axis of the shaft (31), moves aft. The aftward motion of the shaft (31) causes the first pin (18A) to compress the first tubing (16A) and the third tubing (16C) stopping fluid to flow therethrough. The aft motion of the shaft (31) further causes the second pin (18B) to also move aft releasing the second tubing (16B) and the fourth tubing (16D) permitting fluid flow. The aftward motion of the shaft (31) still further causes the third pin (18C) to decompress the helical spring (13). The helical spring (13) is biased in its released state to have sufficient force to compress the compress the first tubing (16A) and the third tubing (16C).

1 Claim, 7 Drawing Sheets

PINCH VALVE ASSEMBLY

CROSS REFERENCE TO RELATED APPLICATIONS

This application is a continuation of the copending application Ser. No. 08/820,477 filed on Mar. 18, 1997 titled Improved Pinch Valve Assembly, now abandoned.

BACKGROUND OF THE INVENTION

1. Field of the Invention

The present invention relates to valves for controlling fluids. More particularly, the present invention relates to valves which control the flow of fluids in flexible tubing by pinching, the tube closed to prevent flow.

2. Description of the Prior Art

Pinch valves control are used with flexible tubing such as surgical tubing or plastic tubing where there is a requirement to isolate the fluid flowing in the valve from the valve components. This tubing must be flexible and resilient. It is required that the tubing can be pinched to an extent that all flow in the tubes is stopped. Further, the tubing must have properties that cause a return to a pre-pinch shape. To be efficient the tubing must be capable of withstanding multiple pinches without damaging effects. Simple pinch valves are found in the art, however, what is needed is a pinch valve which is operable by a controller in an automatic system. A further need is for a pinch valve that operates with minimum power. It is desirable that the valve be installable on tubing already in place without the need for passing an end of the tubing through the valve.

Numerous innovations for Improved Pinch Valve Assembly have been provided in the prior art that are described as follows. Even though these innovations may be suitable for the specific individual purposes to which they address, they differ from the present invention as hereinafter contrasted.

In U.S. Pat. No. 5,190,071, titled Pinch Valve Assembly, invented by Akos Sule, a pinch valve assembly includes a valve body in which a plunger is spring loaded against a portion of a flexible tube which passes through the valve body. The plunger causes the flexible tube to collapse preventing flow through the tube. Energization of a solenoid which is mounted on the valve body causes the plunger to release the tube, permitting flow. In an alternative embodiment, energization of the solenoid causes the plunger to bear on the flexible tube thereby providing a normally open valve arrangement. In another alternative embodiment the plunger bears on a plurality of flexible tubes thereby facilitating simultaneous control of different fluids. In still another alternative embodiment the plunger is mounted in roller bearings and the top of the plunger bears on an electrical switch contact which provides an electrical verification of the open or closed state of the pinch valve assembly.

In U.S. Pat. No. 4,230,151, titled Pinch Valve, invented by Ulf R. S. Jonsson, a pinch valve for controlling the flow through at least two flexible hoses includes an actuating member by which one hose is pinched against an abutment. This abutment is yieldable against a spring bias and normally keeps the other hose pinched. When said one hose has been pinched, the abutment is moved against the spring bias by the actuating member in order to relieve said other hose.

In U.S. Pat. No. 3,823,724, titled Controlling Flow of Medical Fluids, invented by William P. Davis, a medical pinch valve is described having an actuator, a spring loaded plunger and a valving arm which collapses an array of channel-contained medical tubing with memory at a selected site. When open, the memory of the tubing and the pressure of the medical fluid opens the previously occluded site to permit flow. Hence, flow of medical fluid from source to destination sites is facilitated. Only the tubing is sterilized and tubing removal and replacement is rapidly achieved so that "down time" is virtually non-existent.

The above patented inventions differ from the present invention because they fail to describe or claim at least a combination of the following features depicted in the present invention a constant power solenoid combined with a fixed dowel pin spacing.

Numerous innovations for Improved Pinch Valve Assembly have been provided in the prior art that are adapted to be used. Even though these innovations may be suitable for the specific individual purposes to which they address, they would not be suitable for the purposes of the present invention as heretofore described.

SUMMARY OF THE INVENTION

The present invention is a pinch valve which operates with a solenoid. The solenoid has a plunger which when an electrical current is applied to the solenoid coil forces the plunger to extend pushing on a shaft having plurality of pins which alternately squeeze and release a plurality of flexible tubes. A spring biased against the shaft returns the plunger to an initial position. In the returned position a plurality of flexible tubes are alternatively squeezed and released.

The types of problems encountered in the prior art are control fluid flow in flexible hoses with a solenoid valve having a constant voltage through the solenoid coil.

In the prior art, unsuccessful attempts to solve this problem were attempted namely: solenoid valve which are inefficient and complex. However, the problem was solved by the present invention because the solenoid power requirement is reduces while the return spring returns the same force. The design is simplified by the mechanical design so that the bearings may be eliminated without decreasing the life expectancy of the valve.

The present invention went contrary to the teaching of the art because a "stroking technique is used to permit using a solenoid having a fixed voltage which operates a series of dowel pins over a preselected range.

The present invention solved a long felt need a simple cost effective solenoid valve that overcomes the limits of the prior art.

The present invention produced unexpected results namely that the power required for a fluid control system is dramatically reduced because of the reduced power required to operate the present invention.

Accordingly, it is an object of the present invention to provide fluid flow control valve which functions with flexible tubing.

More particularly, it is an object of the present invention to provide solenoid controlled pinch valve which is simple and require less operating power.

In keeping with these objects, and with others which will become apparent hereinafter, one feature of the present invention resides, briefly stated, in low power solenoid controlled pinch valve.

When the improved pinch valve assembly is designed in accordance with the present invention, lower power, cost effective pinch valve results.

In accordance with another feature of the present invention, a plunger is attached to a shaft which supports a pair of dowel pins.

Another feature of the present invention is that the dowel pins are positioned to bear against a flexible hose when the solenoid is energized.

Yet another feature of the present invention is that the dowel pins are positioned to bear against a flexible hose by a return spring when the solenoid is not energized.

Still another feature of the present invention is that the return spring provides sufficient force on the shaft, when the solenoid is deenergized, which is directed against the flexible hose by a plurality of pins to pinch a first set of flexible hoses off.

Yet still another feature of the present invention is that the solenoid provides sufficient force on the shaft which is directed against the flexible hose by a plurality of pins to pinch a second set of flexible hose off.

Still yet another feature of the present invention is that the solenoid applies a force with a constant voltage.

Another feature of the present invention is that separate fluid flows can be controlled exactly and distinctly.

Yet another feature of the present invention is that fluids are isolated from the valve parts.

Still another feature of the present invention is that the valve may be installed without removing the hose ends.

Yet still another feature of the present invention is that standard hoses can be used.

Still yet another feature of the present invention is that a plurality of hoses can be controlled simultaneously.

Another feature of the present invention is that a plurality of fluids can be controlled simultaneously.

Yet another feature of the present invention is that corrosive fluids can be controller without danger of leakage.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—improved pinch valve assembly (10)
12—front block (12)
12A—front block cylindrical indent (12A)
12BA—front block first fastener opening (12BA)
12BB—front block second fastener opening (12BB)
13—helical spring (13)
14—valve block (14)
14A—valve block front plate (14A)
14AA—valve block front plate central opening (14AA)
14ABA—valve block front plate first fastener opening (14ABA)
14ABB—valve block front plate second fastener opening (14ABB)
14B—valve block middle plate (14B)
14BA—valve block middle plate central opening (not shown)
14BBA—valve block middle plate first fastener opening (not shown)
14BBB—valve block middle plate second fastener opening (not shown)
14C—valve block rear plate (14C)
14CA—valve block rear plate central opening (not shown)
14CBA—valve block rear plate first fastener opening (not shown)
14CBB—valve block rear plate second fastener opening (not shown)
16—tubing (16)
16A—first tubing (16A)
16B—second tubing (16B)
16C—third tubing (16C)
16D—fourth tubing (16D)
18—pins (18)
18A—first pin (18A)
18B—second pin (18B)
18C—third pin (18C)
20—stop plate (20)
20AA—stop plate central shaft central opening (20AA)
20AB—stop plate central shaft recepticle (20AB)
20BA—stop plate first threaded opening (20BA)
20BB—stop plate second threaded opening (20BB)
22—solenoid coil (22)
22A—solenoid coil central opening (22A)
22B—solenoid coil wire (22B)
24—stop plate end cap (24)
24A—stop plate end cap central opening (24A)
24BA—stop plate end cap first fastener threaded opening (24BA)
24BB—stop plate end cap second fastener threaded opening (24BB)
26—housing (26)
26A—housing first pin spring (26A)
26AA—housing first pin spring opening (26AA)
26B—housing second pin spring (26B)
26BA—housing second pin spring opening (26BA)
28—plunger (28)
30—nut (30)
31—shaft (31)
31A—shaft front end (31A)
31B—shaft rear end (31B)
31C—shaft front slot (31C)
31D—shaft middle slot (31D)
31E—shaft rear slot (31E)
32—gasket (32)
32A—gasket central opening (32A)
32BA—gasket first fastener opening (32BA)
32BB—gasket second fastener opening (32BB)
32C—gasket notch (32C)
34—rear block (34)
34A—rear block central indent (34A)
34BA—rear block first fastener opening (34BA)
34BB—rear block second fastener opening (34BB)
34C—rear block notch (34C)
36A—first front threaded fastener (36A)
36B—second front threaded fastener (36B)
38A—first rear threaded fastener (38A)
38B—second rear threaded fastener (38B)

DESCRIPTION OF THE PREFERRED EMBODIMENT

Figure 1:
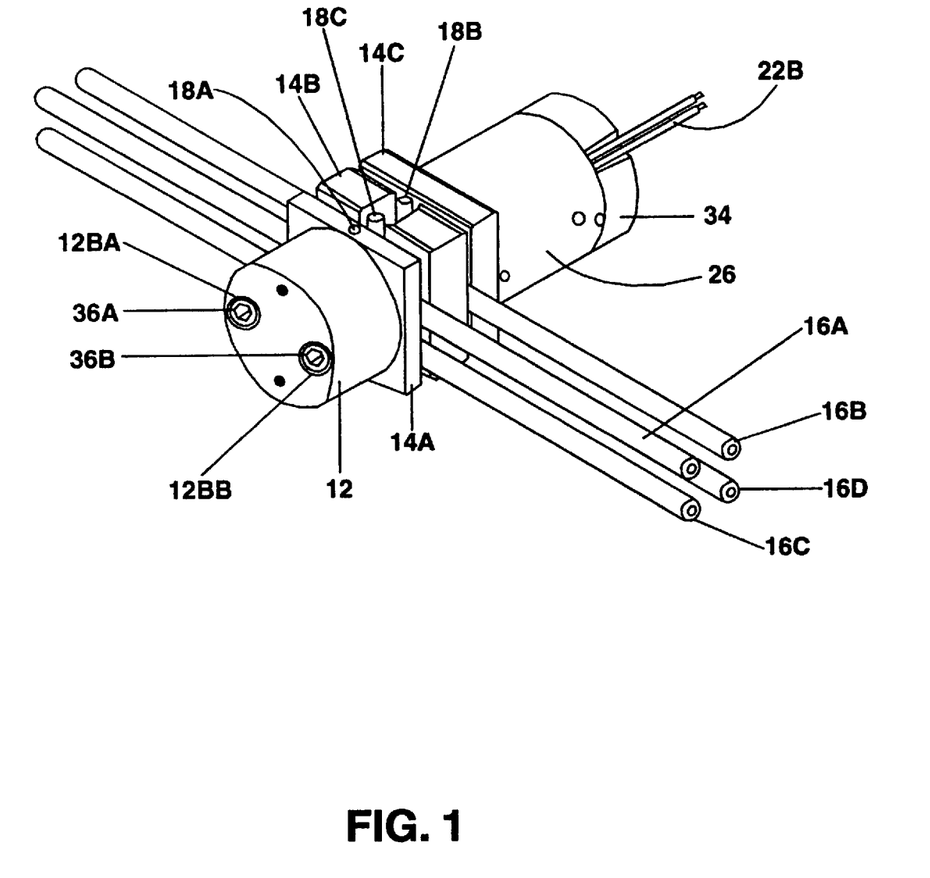
FIG. 1 is a perspective view of an improved pinch valve assembly.

Firstly, referring to FIG. 1 which is a perspective view of an improved pinch valve assembly (10). The improved pinch valve assembly (10) comprises a front block (12). The front block (12) comprises a front block first fastener opening (12BA) therethrough and a front block second fastener opening (12BB) therethrough.

The improved pinch valve assembly (10) further comprises a valve block (14) which is positioned rearwardly adjacent to the front block (12). The valve block (14) comprises a valve block front plate (14A). The valve block (14) further comprises a valve block middle plate (14B) having a valve block middle plate central opening (not shown) therethrough and a valve block middle plate first fastener opening (not shown) therethrough and a valve block middle plate second fastener opening (not shown) therethrough. The valve block (14) further comprises a valve block rear plate (14C) having a valve block rear plate central opening (not shown) therethrough and a valve block rear plate first fastener opening (not shown) therethrough and a valve block rear plate second fastener opening (not shown) therethrough.

The improved pinch valve assembly (10) further comprises a plurality of tubing (16) positioned through the valve block (14). The plurality of tubing (16) comprises a first tubing (16A) positioned on an upper end between the valve block front plate (14A) and the valve block middle plate (14B). The plurality of tubing (16) further comprises a second tubing (16B) positioned on an upper end between the valve block middle plate (14B) and the valve block rear plate (14C). The plurality of tubing (16) comprises a third tubing (16C) positioned on a lower end between the valve block front plate (14A) and the valve block middle plate (14B). The plurality of tubing (16) further comprises a fourth tubing (16D) positioned on a lower end between the valve block middle plate (14B) and the valve block rear plate (14C).

The improved pinch valve assembly (10) further comprises a plurality of pins (18) positioned through the valve block (14). The plurality of pins (18) comprises a first pin (18A) positioned from top to bottom through the valve block front plate (14A). The plurality of pins (18) further comprises a second pin (18B) positioned from top to bottom, rearward and adjacent to the first tubing (16A) and the third tubing (16C). The plurality of pins (18) further comprises a third pin (18C) positioned from top to bottom and frontward of he second tubing (16B) and the fourth tubing (16D).

The improved pinch valve assembly (10) further comprises a first front threaded fastener (36A) positioned through the front block first fastener opening (12BA) and the valve block front plate first fastener opening (14ABA) and the valve block middle plate first fastener opening (not shown) and the valve block rear plate first fastener opening (not shown). The improved pinch valve assembly (10) further comprises a second front threaded fastener (36B) positioned through the front block second fastener opening (12BB) and the valve block front plate second fastener opening (14ABB) and the valve block middle plate second fastener opening (not shown) and the valve block rear plate second fastener opening (not shown.

The improved pinch valve assembly (10) further comprises a solenoid coil wire (22B) extending from a top end thereof.

The improved pinch valve assembly (10) further comprises a rear block (34) positioned rearwardly of a housing (26). The rear block (34) comprises an exit aperture for the solenoid coil wire (22B) therein.

Figure 2:
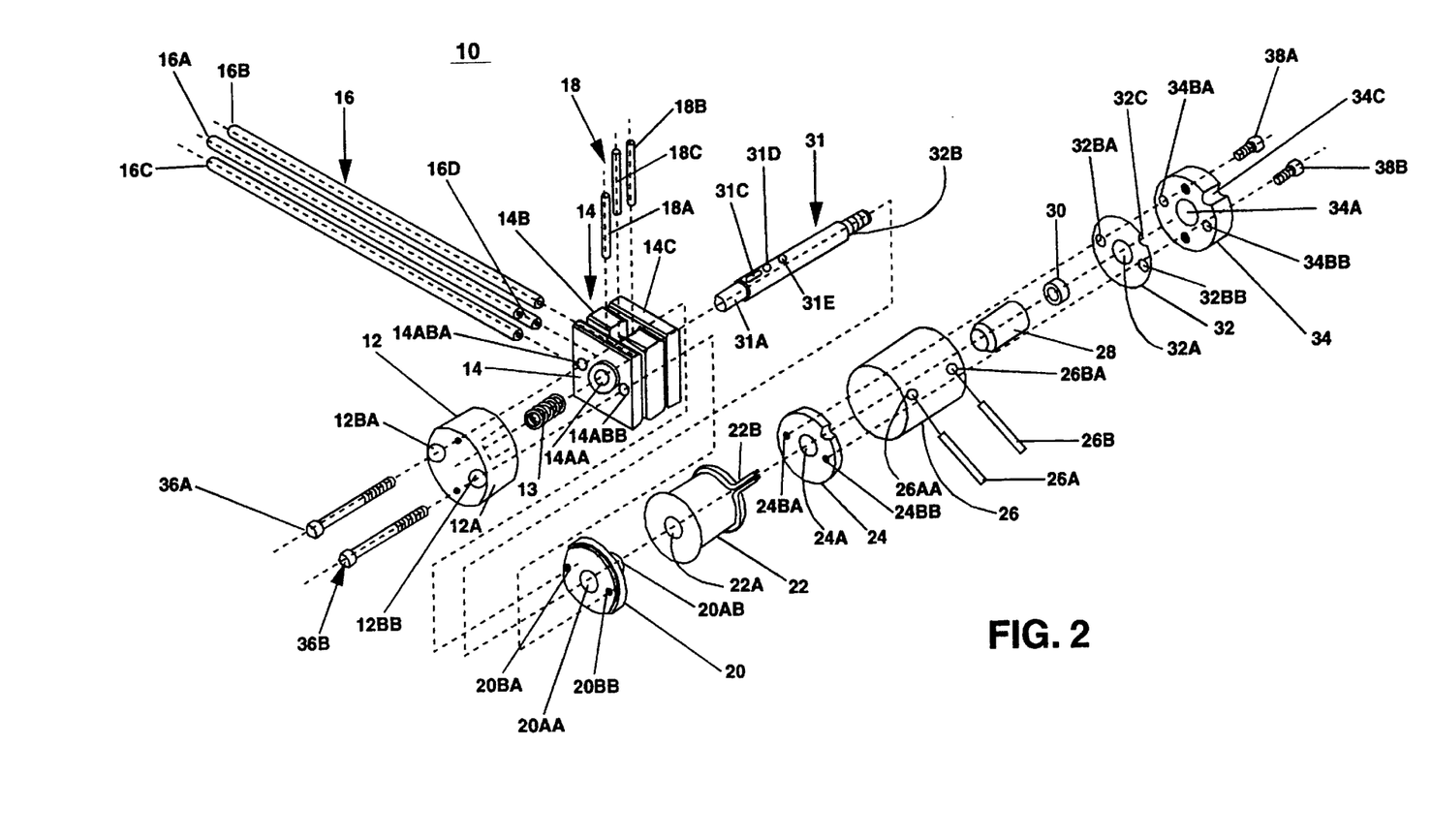
FIG. 2 is a exploded view of an improved pinch valve assembly.

Secondly, referring to FIG. 2 which is a exploded view of the improved pinch valve assembly (10) which comprises the front block (12). The front block (12) comprises a front block cylindrical indent (12A) and the front block first fastener opening (12BA) therethrough and the front block second fastener opening (12BB) therethrough.

The improved pinch valve assembly (10) further comprises the valve block (14) which is positioned rearwardly adjacent to the front block (12). The valve block (14) comprises the valve block front plate (14A) having a valve block front plate central opening (14AA) therethrough and a valve block front plate first fastener opening (14ABA) therethrough and a valve block front plate second fastener opening (14ABB) therethrough. The valve block (14) further comprises the valve block middle plate (14B) having a valve block middle plate central opening (not shown) therethrough and a valve block middle plate first fastener opening (not shown) therethrough and a valve block middle plate second fastener opening (not shown) therethrough. The valve block (14) further comprises the valve block rear plate (14C) having the valve block rear plate central opening (not shown) therethrough and the valve block rear plate first fastener opening (not shown) therethrough and the valve block rear plate second fastener opening (not shown) therethrough.

The improved pinch valve assembly (10) further comprises the plurality of tubing (16)which is positioned through the valve block (14). The valve block middle plate (14B) comprises a plurality of tubing receptive grooves functioning to grasp the plurality of tubing (16). The plurality of tubing (16) consists of at least one first tubing (16A). The plurality of tubing (16) comprises the first tubing (16A) which is positioned on an upper end between the valve block front plate (14A) and the valve block middle plate (14B). The plurality of tubing (16) further comprises the second tubing (16B) which is positioned on an upper end between the valve block middle plate (14B) and the valve block rear plate (14C). The plurality of tubing (16) comprises the third tubing (16C) p which is positioned on the lower end between the valve block front plate (14A) and the valve block middle plate (14B). The plurality of tubing (16) further comprises the fourth tubing (16D) which is positioned on the lower end between the valve block middle plate (14B) and the valve block rear plate (14C).

The improved pinch valve assembly (10) further comprises the plurality of pins (18) which is positioned through the valve block (14). The plurality of pins (18) comprises the first pin (18A) which is positioned from top to bottom through the valve block front plate (14A). The plurality of pins (18) further comprises the second pin (18B) which is positioned from top to bottom, rearward and adjacent to the first tubing (16A) and the third tubing (16C). The plurality of pins (18) further comprises the third pin (18C) which is positioned from top to bottom and frontward of the second tubing (16B) and the fourth tubing (16D).

The improved pinch valve assembly (10) further comprises a stop plate (20) which comprises a stop plate central shaft receptacle (20AB) having a stop plate central shaft central opening (20AA) therethrough. The stop plate (20) further comprises a stop plate first threaded opening (20BA) and a stop plate second threaded opening (20BB).

The improved pinch valve assembly (10) further comprises the first front threaded fastener (36A)which is positioned through the front block first fastener opening (12BA) and the valve block front plate first fastener opening (14ABA) and the valve block middle plate first fastener opening (not shown) and the valve block rear plate first fastener opening (not shown) engaging the stop plate first threaded opening (20BA).

The improved pinch valve assembly (10) further comprises the second front threaded fastener (36B)which is positioned through the front block second fastener opening (12BB) and the valve block front plate second fastener opening (14ABB) and the valve block middle plate second fastener opening (not shown) and the valve block rear plate second fastener opening (not shown) engaging the stop plate second threaded opening (20BB).

The improved pinch valve assembly (10) further comprises a solenoid coil (22) rearwardly positioned adjacent the stop plate (20). The solenoid coil (22) comprises a solenoid coil central opening (22A) therethrough. The solenoid coil (22) further comprises the solenoid coil wire (22B) extending from the top end thereof.

The improved pinch valve assembly (10) further comprises a stop plate end cap (24) rearwardly positioned adjacent the solenoid coil (22). The stop plate end cap (24) comprises a stop plate end cap central opening (24A) therethrough and a stop plate end cap first fastener threaded opening (24BA) therethrough and a stop plate end cap second fastener threaded opening (24BB) therethrough.

The improved pinch valve assembly (10) further comprises a hollow plunger (28) rearwardly positioned engaging the stop plate end cap (24). The hollow plunger (28) is positioned within the solenoid coil central opening (22A).

The improved pinch valve assembly (10) further comprises a gasket (32) rearwardly positioned adjacent the hollow plunger (28), the gasket (32) comprises a gasket central opening (32A) therethrough and a gasket first fastener opening (32BA) and a gasket second fastener opening (32BB) therethrough and a gasket notch (32C) therethrough which functions to accept the solenoid coil wire (22B) therein.

The improved pinch valve assembly (10) further comprises the rear block (34) rearwardly positioned adjacent the gasket (32), the rear block (34) comprises a rear block central indent (34A) therein and a rear block first fastener opening (34BA) therethrough and a rear block second fastener opening (34BB) therethrough and a rear block notch (34C) which functions to accept the solenoid coil wire (22B) therein.

The improved pinch valve assembly (10) further comprises the housing (26) abutting the stop plate (20) on a front end and abutting the rear block (34) on a rear end, the housing (26) is positioned over the solenoid coil (22) and the stop plate end cap (24) and the gasket (32), the housing (26) further comprises a housing first pin spring opening (26AA) therethrough having a housing first pin spring (26A) positioned therein. The housing (26) further comprises a housing second pin spring opening (26BA) therethrough having a housing second pin spring (26B) positioned therein;

The improved pinch valve assembly (10) further comprises a shaft (31) which comprises a shaft front end (31A) and a shaft rear end (31B). The shaft (31) further comprises a shaft front slot (31C) and a shaft middle slot (31D) and a shaft rear slot (3E) therein. The shaft (31) is positioned through the valve block front plate central opening (14AA) and the valve block middle plate central opening (not shown) and the valve block rear plate central opening (not shown) and the stop plate central shaft central opening (20AA) and the plunger (28) and the gasket central opening (32A), the shaft front end (31A) is positioned in the front block cylindrical indent (12A). The shaft rear end (31B) is positioned in the rear block central indent (34A), a nut (30) threadably engaged on the shaft rear end (31B).

The improved pinch valve assembly (10) further comprises a helical spring (13) is positioned on the shaft (31) between the front block (12) and the valve block front plate (14A).

The improved pinch valve assembly (10) further comprises a first rear threaded fastener (38A) is positioned through the gasket first fastener opening (32BA) and the rear block first fastener opening (34BA) engaging the stop plate end cap first fastener threaded opening (24BA).

The improved pinch valve assembly (10) further comprises a second rear threaded fastener (38B) is positioned through the gasket second fastener opening (32BB) and the rear block second fastener opening (34BB) engaging the stop plate end cap second fastener threaded opening (24BB).

The improved pinch valve assembly (10) functions to control the flow of fluids on a fluid system. The improved pinch valve assembly (10) controls plurality of fluid containing tubing (16). When the solenoid coil (22) is energized the plunger (28), which is securely attached to the shaft (31) which has a first pin (18A) and a second pin (18B) securely attached perpendicular to the longitudinal axis of the shaft (31), moves forward. The forward motion of the shaft (31) causes the first pin (18A) to decompress the first tubing (16A) and the third tubing (16C) permitting fluid to flow therethrough. The forward motion of the shaft (31) further causes the second pin (18B) to also move forward compressing the second tubing (16B) and the fourth tubing (16D) stopping fluid flow. The forward motion of the shaft (31) still further causes the third pin (18C) to compress the helical spring (13).

When the solenoid coil (22) is de-energized the plunger (28), which is securely attached to the shaft (31) which has the first pin (18A) and the second pin (18B) securely attached perpendicular to the longitudinal axis of the shaft (31), moves aft. The aftward motion of the shaft (31) causes the first pin (18A) to compress the first tubing (16A) and the third tubing (16C) stopping fluid to flow therethrough. The aft motion of the shaft (31) further causes the second pin (18B) to also move aft releasing the second tubing (16B) and the fourth tubing (16D) permitting fluid flow. The aftward motion of the shaft (31) still further causes the third pin (18C) to decompress the helical spring (13). The helical spring (13) is biased in its released state to have sufficient force to compress the compress the first tubing (16A) and the third tubing (16C).

Attachment of the improved pinch valve assembly (10) to a plurality of tubing (16) is accomplished by loosening the first front threaded fastener (36A) and the second front threaded fastener (36B) which permits the valve block (14) components valve block front plate (14A) and valve block middle plate (14B) and valve block rear plate (14C), to separate enough to allow the plurality of tubing (16) to be positioned therebetween. Tightening the first front threaded fastener (36A) and the second front threaded fastener (36B) securely captures the plurality of tubing (16).

Figure 3A:
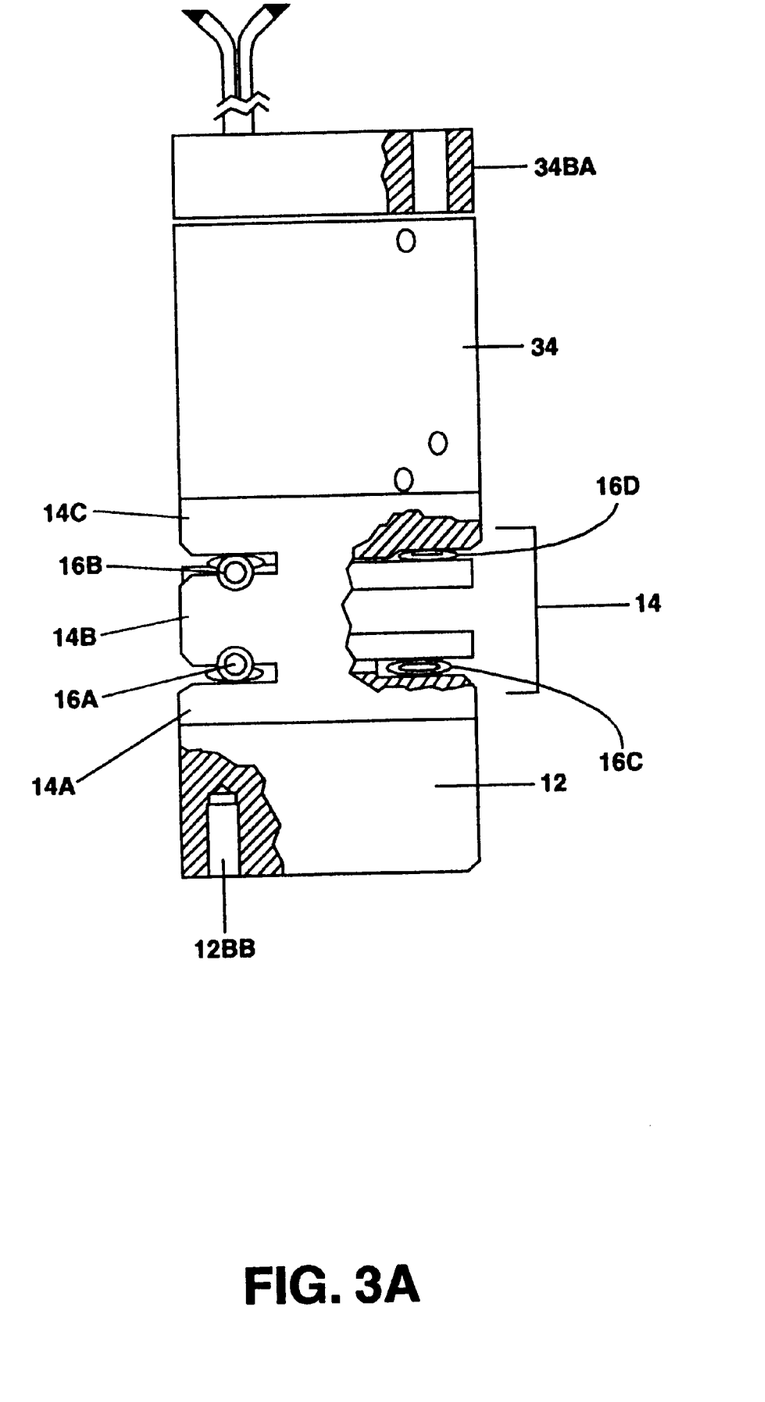
FIG. 3A is a cross-sectional view of an improved pinch valve assembly with the solenoid relaxed.
Figure 3B:
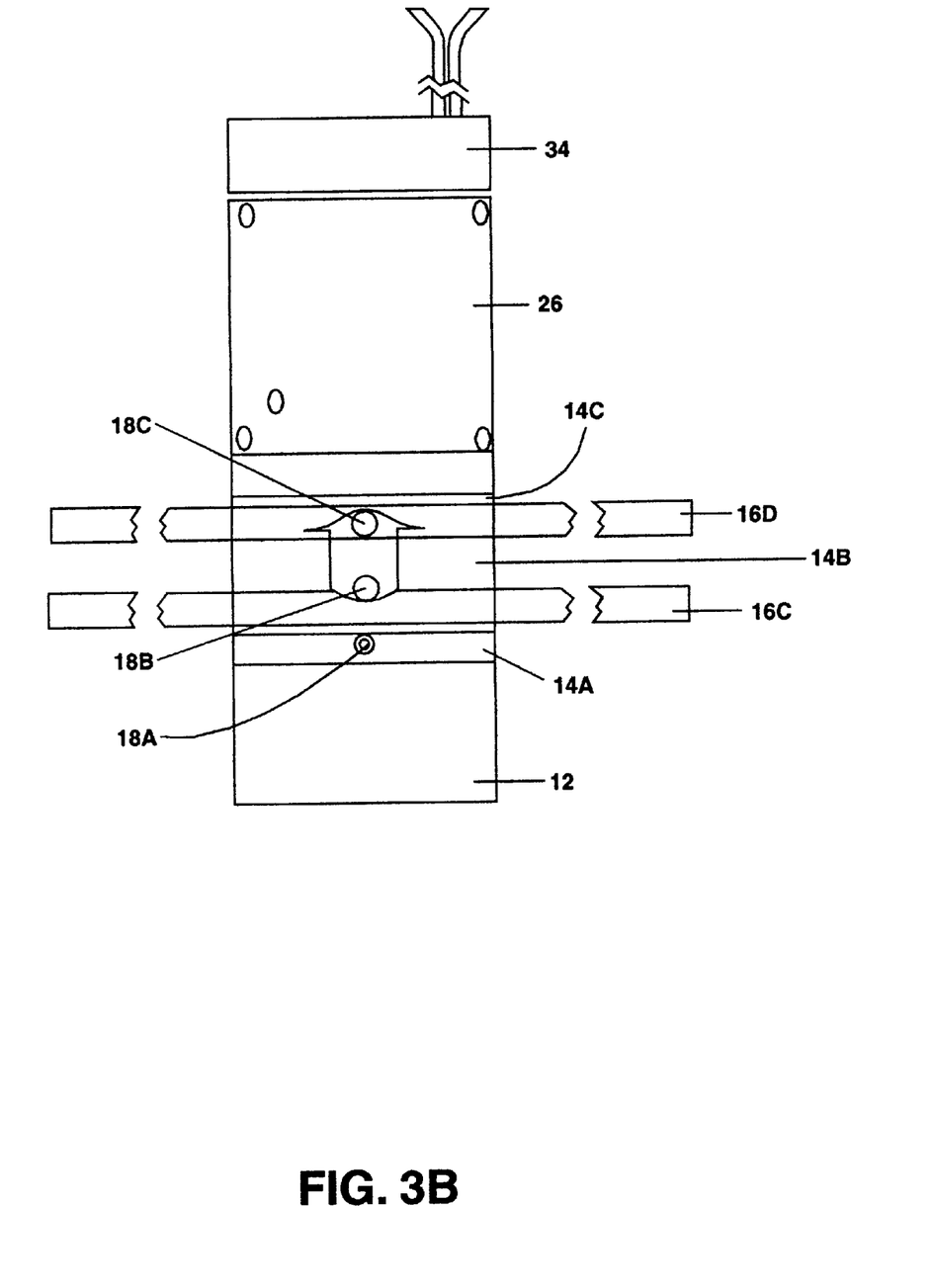
FIG. 3B is a side view of an improved pinch valve assembly.
Figure 3C:
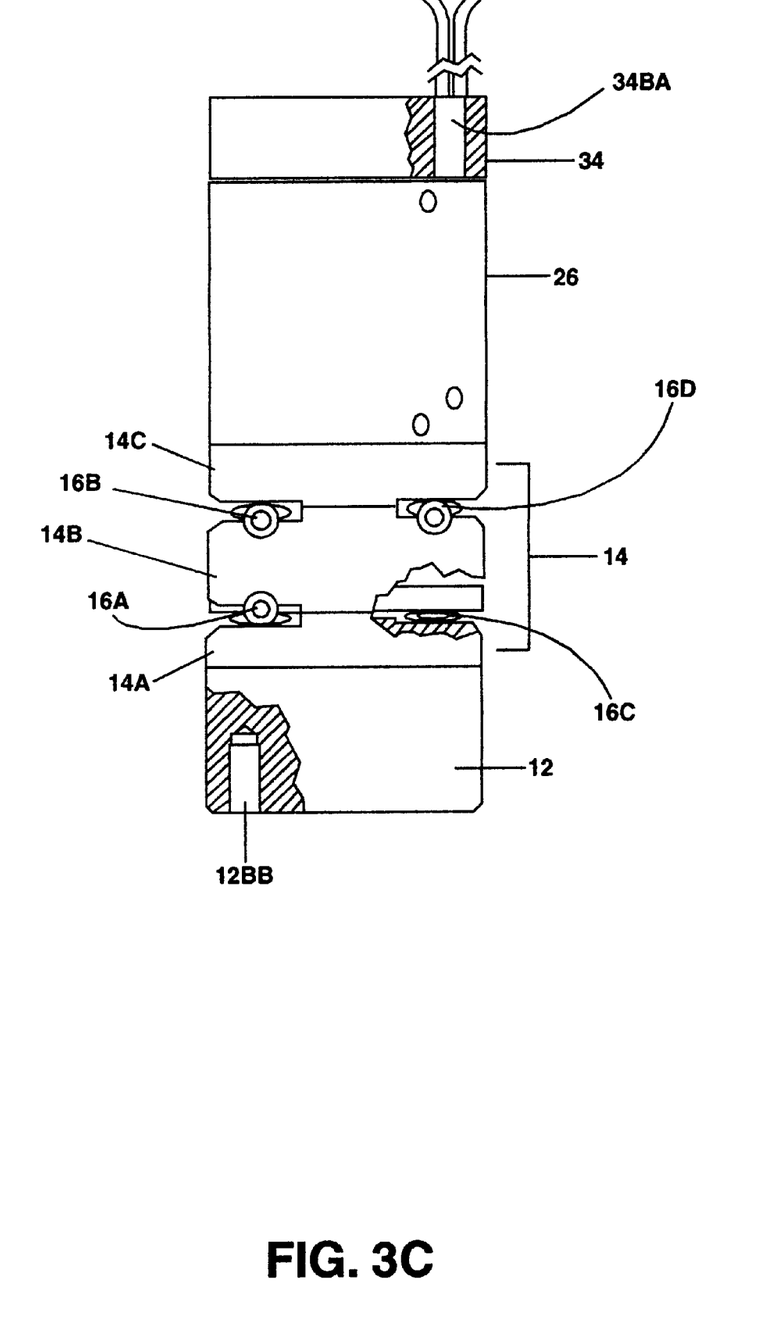
FIG. 3C is a cross-sectional view of an improved pinch valve assembly with the solenoid energized.

Now, referring to FIG. 3A which is a cross-sectional view of an improved pinch valve assembly (10) with the solenoid relaxed, FIG. 3B which is a side view of an improved pinch valve assembly (10), and FIG. 3C which is a cross-sectional view of an improved pinch valve assembly (10) with the solenoid energized, together. The improved pinch valve assembly (10) functions to control the flow of fluids on a fluid system. The improved pinch valve assembly (10) controls plurality of fluid containing tubing (16). When the solenoid coil (22) is energized the plunger (28), which is securely attached to the shaft (31) which has a first pin (18A) and a second pin (18B) securely attached perpendicular to the longitudinal axis of the shaft (31), moves forward. The forward motion of the shaft (31) causes the first pin (18A) to decompress the first tubing (16A) and the third tubing (16C) permitting fluid to flow therethrough. The forward motion of the shaft (31) further causes the second pin (18B) to also move forward compressing the second tubing (16B) and the fourth tubing (16D) stopping fluid flow. The forward motion of the shaft (31) still further causes the third pin (18C) to compress the helical spring (13).

When the solenoid coil (22) is de-energized the plunger (28), which is securely attached to the shaft (31) which has the first pin (18A) and the second pin (18B) securely attached perpendicular to the longitudinal axis of the shaft (31), moves aft. The aftward motion of the shaft (31) causes the first pin (18A) to compress the first tubing (16A) and the third tubing (16C) stopping fluid to flow therethrough. The aft motion of the shaft (31) further causes the second pin (18B) to also move aft releasing the second tubing (16B) and the fourth tubing (16D) permitting fluid flow. The aftward motion of the shaft (31) still further causes the third pin (18C) to decompress the helical spring (13). The helical spring (13) is biased in its released state to have sufficient force to compress the compress the first tubing (16A) and the third tubing (16C).

Attachment of the improved pinch valve assembly (10) to a plurality of tubing (16) is accomplished by loosening the first front threaded fastener (36A) and the second front threaded fastener (36B) which permits the valve block (14) components valve block front plate (14A) and valve block middle plate (14B) and valve block rear plate (14C), to separate enough to allow the plurality of tubing (16) to be positioned therebetween. Tightening the first front threaded fastener (36A) and the second front threaded fastener (36B) securely captures the plurality of tubing (16).

Figure 4A:
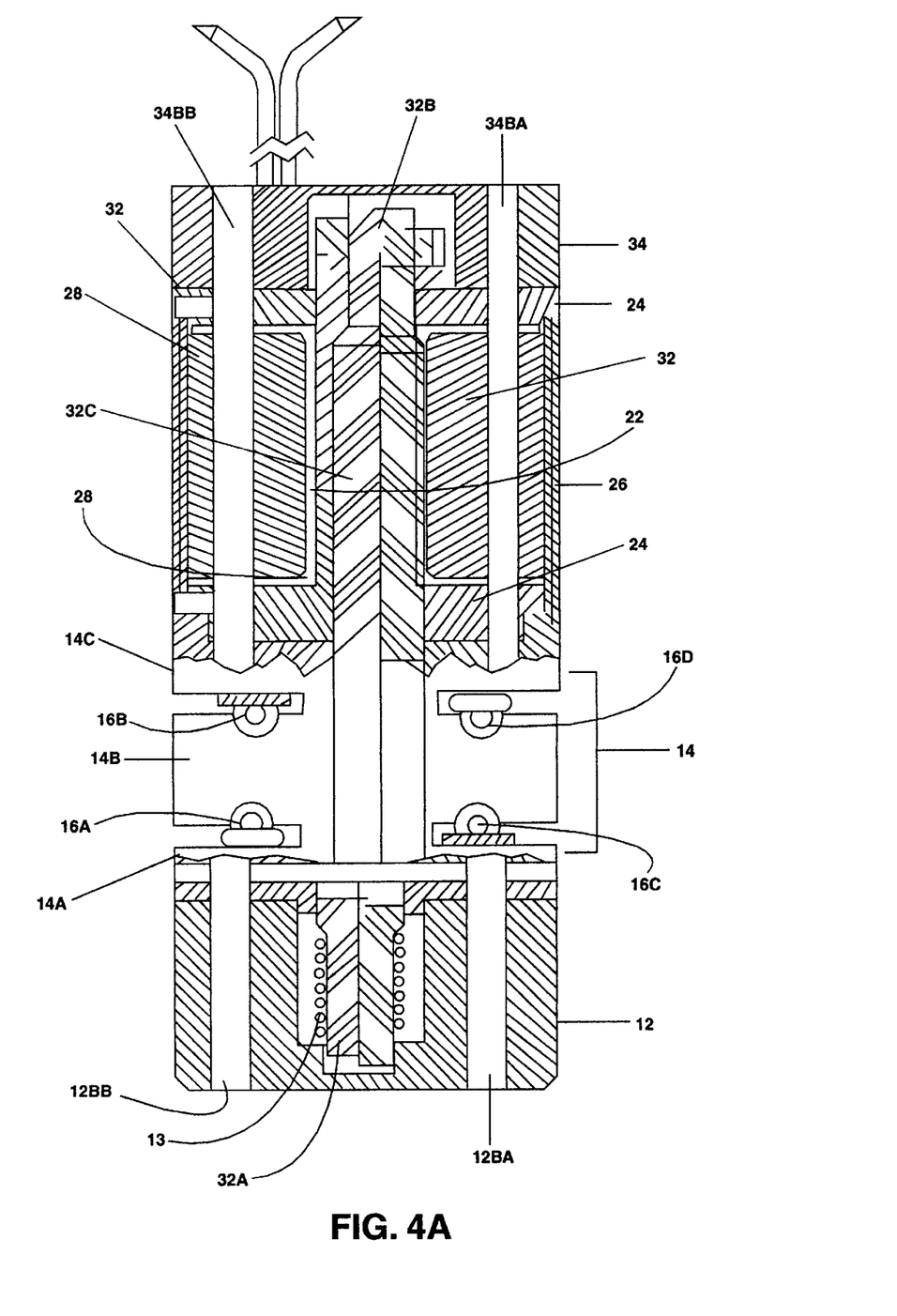
FIG. 4A is a front cross-sectional view of an improved pinch valve assembly showing the solenoid relaxed to the left and energized to the right.
Figure 4B:
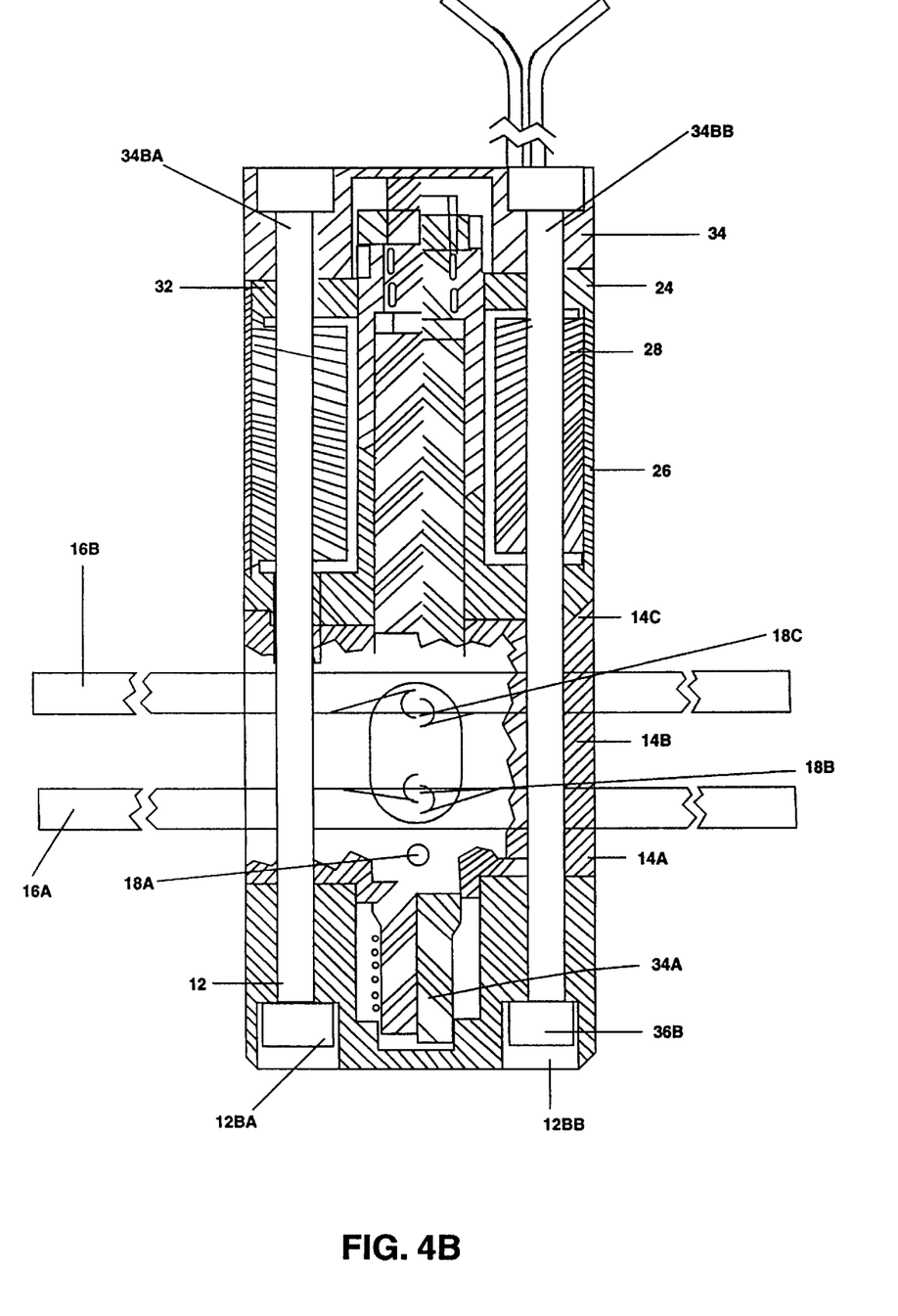
FIG. 4B is a side cross-sectional view of an improved pinch valve assembly showing the solenoid relaxed to the left and energized to the right.

Lastly, referring to FIG. 4A which is a front cross-sectional view of an improved pinch valve assembly (10) showing the solenoid relaxed to the left and energized to the right, and FIG. 4B which is a side cross-sectional view of an improved pinch valve assembly (10) showing the solenoid relaxed to the left and energized to the right. The improved pinch valve assembly (10) comprises the front block (12). The front block (12) comprises a front block cylindrical indent (12A) and the front block first fastener opening (12BA) therethrough and the front block second fastener opening (12BB) therethrough.

The improved pinch valve assembly (10) further comprises the valve block (14) which is positioned rearwardly adjacent to the front block (12). The valve block (14) comprises the valve block front plate (14A) having a valve block front plate central opening (14AA) therethrough and a valve block front plate first fastener opening (14ABA) therethrough and a valve block front plate second fastener opening (14ABB) therethrough. The valve block (14) further comprises the valve block middle plate (14B) having a valve block middle plate central opening (not shown) therethrough and a valve block middle plate first fastener opening (not shown) therethrough and a valve block middle plate second fastener opening (not shown) therethrough. The valve block (14) further comprises the valve block rear plate (14C) having the valve block rear plate central opening (not shown) therethrough and the valve block rear plate first fastener opening (not shown) therethrough and the valve block rear plate second fastener opening (not shown) therethrough.

The improved pinch valve assembly (10) further comprises the plurality of tubing (16)which is positioned through the valve block (14). The valve block middle plate (14B) comprises a plurality of tubing receptive grooves functioning to grasp the plurality of tubing (16). The plurality of tubing (16) consists of at least one first tubing (16A). The plurality of tubing (16) comprises the first tubing (16A) which is positioned on an upper end between the valve block front plate (14A) and the valve block middle plate (14B). The plurality of tubing (16) further comprises the second tubing (16B) which is positioned on an upper end between the valve block middle plate (14B) and the valve block rear plate (14C). The plurality of tubing (16) comprises the third tubing (16C) p which is positioned on the lower end between the valve block front plate (14A) and the valve block middle plate (14B). The plurality of tubing (16) further comprises the fourth tubing (16D) which is positioned on the lower end between the valve block middle plate (14B) and the valve block rear plate (14C).

The improved pinch valve assembly (10) further comprises the plurality of pins (18) which is positioned through the valve block (14). The plurality of pins (18) comprises the first pin (18A) which is positioned from top to bottom through the valve block front plate (14A). The plurality of pins (18) further comprises the second pin (18B) which is positioned from top to bottom, rearward and adjacent to the first tubing (16A) and the third tubing (16C). The plurality of pins (18) further comprises the third pin (18C) which is positioned from top to bottom and frontward of the second tubing (16B) and the fourth tubing (16D).

The improved pinch valve assembly (10) further comprises a stop plate (20) which comprises a stop plate central shaft receptacle (20AB) having a stop plate central shaft central opening (20AA) therethrough. The stop plate (20) further comprises a stop plate first threaded opening (20BA) and a stop plate second threaded opening (20BB).

The improved pinch valve assembly (10) further comprises the first front threaded fastener (36A)which is positioned through the front block first fastener opening (12BA) and the valve block front plate first fastener opening (14ABA) and the valve block middle plate first fastener opening (not shown) and the valve block rear plate first fastener opening (not shown) engaging the stop plate first threaded opening (20BA).

The improved pinch valve assembly (10) further comprises the second front threaded fastener (36B)which is positioned through the front block second fastener opening (12BB) and the valve block front plate second fastener opening (14ABB) and the valve block middle plate second fastener opening (not shown) and the valve block rear plate second fastener opening (not shown) engaging the stop plate second threaded opening (20BB).

The improved pinch valve assembly (10) further comprises a solenoid coil (22) rearwardly positioned adjacent the stop plate (20). The solenoid coil (22) comprises a solenoid coil central opening (22A) therethrough. The solenoid coil (22) further comprises the solenoid coil wire (22B) extending from the top end thereof.

The improved pinch valve assembly (10) further comprises a stop plate end cap (24) rearwardly positioned adjacent the solenoid coil (22). The stop plate end cap (24) comprises a stop plate end cap central opening (24A) therethrough and a stop plate end cap first fastener threaded opening (24BA) therethrough and a stop plate end cap second fastener threaded opening (24BB) therethrough.

The improved pinch valve assembly (10) further comprises a hollow plunger (28) rearwardly positioned engaging the stop plate end cap (24). The hollow plunger (28) is positioned within the solenoid coil central opening (22A).

The improved pinch valve assembly (10) further comprises a gasket (32) rearwardly positioned adjacent the hollow plunger (28), the gasket (32) comprises a gasket central opening (32A) therethrough and a gasket first fastener opening (32BA) and a gasket second fastener opening (32BB) therethrough and a gasket notch (32C) therethrough which functions to accept the solenoid coil wire (22B) therein.

The improved pinch valve assembly (10) further comprises the rear block (34) rearwardly positioned adjacent the gasket (32), the rear block (34) comprises a rear block central indent (34A) therein and a rear block first fastener opening (34BA) therethrough and a rear block second fastener opening (34BB) therethrough and a rear block notch (34C) which functions to accept the solenoid coil wire (22B) therein.

The improved pinch valve assembly (10) further comprises the housing (26) abutting the stop plate (20) on a front end and abutting the rear block (34) on a rear end, the housing (26) is positioned over the solenoid coil (22) and the stop plate end cap (24) and the gasket (32), the housing (26) further comprises a housing first pin spring opening (26AA) therethrough having a housing first pin spring (26A) positioned therein. The housing (26) further comprises a housing second pin spring opening (26BA) therethrough having a housing second pin spring (26B) positioned therein;

The improved pinch valve assembly (10) further comprises a shaft (31) which comprises a shaft front end (31A) and a shaft rear end (31B). The shaft (31) further comprises a shaft front slot (31C) and a shaft middle slot (31D) and a shaft rear slot (3E) therein. The shaft (31) is positioned through the valve block front plate central opening (14AA) and the valve block middle plate central opening (not shown) and the valve block rear plate central opening (not shown) and the stop plate central shaft central opening (20AA) and the plunger (28) and the gasket central opening (32A), the shaft front end (31A) is positioned in the front block cylindrical indent (12A). The shaft rear end (31B) is positioned in the rear block central indent (34A), a nut (30) threadably engaged on the shaft rear end (31B).

The improved pinch valve assembly (10) further comprises a helical spring (13) is positioned on the shaft (31) between the front block (12) and the valve block front plate (14A).

The improved pinch valve assembly (10) further comprises a first rear threaded fastener (38A) is positioned through the gasket first fastener opening (32BA) and the rear block first fastener opening (34BA) engaging the stop plate end cap first fastener threaded opening (24BA).

The improved pinch valve assembly (10) further comprises a second rear threaded fastener (38B) is positioned through the gasket second fastener opening (32BB) and the rear block second fastener opening (34BB) engaging the stop plate end cap second fastener threaded opening (24BB).

The improved pinch valve assembly (10) functions to control the flow of fluids on a fluid system. The improved pinch valve assembly (10) controls plurality of fluid containing tubing (16). When the solenoid coil (22) is energized the plunger (28), which is securely attached to the shaft (31) which has a first pin (18A) and a second pin (18B) securely attached perpendicular to the longitudinal axis of the shaft (31), moves forward. The forward motion of the shaft (31) causes the first pin (18A) to decompress the first tubing (16A) and the third tubing (16C) permitting fluid to flow therethrough. The forward motion of the shaft (31) further causes the second pin (18B) to also move forward compressing the second tubing (16B) and the fourth tubing (16D) stopping fluid flow. The forward motion of the shaft (31) still further causes the third pin (18C) to compress the helical spring (13).

When the solenoid coil (22) is de-energized the plunger (28), which is securely attached to the shaft (31) which has the first pin (18A) and the second pin (18B) securely attached perpendicular to the longitudinal axis of the shaft (31), moves aft. The aftward motion of the shaft (31) causes the first pin (18A) to compress the first tubing (16A) and the third tubing (16C) stopping fluid to flow therethrough. The aft motion of the shaft (31) further causes the second pin (18B) to also move aft releasing the second tubing (16B) and the fourth tubing (16D) permitting fluid flow. The aftward motion of the shaft (31) still further causes the third pin (18C) to decompress the helical spring (13). The helical spring (13) is biased in its released state to have sufficient force to compress the compress the first tubing (16A) and the third tubing (16C).

Attachment of the improved pinch valve assembly (10) to a plurality of tubing (16) is accomplished with out removing the ends of the a plurality of tubing (16), by loosening the first front threaded fastener (36A) and the second front threaded fastener (36B) which permits the valve block (14) components valve block front plate (14A) and valve block middle plate (14B) and valve block rear plate (14C), to separate enough to allow the plurality of tubing (16) to be positioned therebetween. Tightening the first front threaded fastener (36A) and the second front threaded fastener (36B) securely captures the plurality of tubing (16).

It will be understood that each of the elements described above, or two or more together, may also find a useful application in other types of constructions differing from the type described above.

While the invention has been illustrated and described as embodied in a Improved Pinch Valve Assembly, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. An improved pinch valve assembly (10) comprising:
A) a front block (12) which comprises a front block cylindrical indent (12A) and a front block first fastener opening (12BA) therethrough and a front block second fastener opening (12BB) therethrough;
B) a valve block (14) positioned rearwardly adjacent to the front block (12), the valve block (14) comprises a valve block front plate (14A) having a valve block front plate central opening (14AA) therethrough and a valve block front plate first fastener opening (14ABA) therethrough and a valve block front plate second fastener opening (14ABB) therethrough, the valve block (14) further comprises a valve block middle plate (14B) having a valve block middle plate central opening therethrough and a valve block middle plate first fastener opening therethrough and a valve block middle plate second fastener opening therethrough, the valve block (14) further comprises a valve block rear plate (14C) having a valve block rear plate central opening therethrough and a valve block rear plate first fastener opening therethrough and a valve block rear plate second fastener opening therethrough;

C) a plurality of tubing (16) positioned through the valve block (14), the plurality of tubing (16) comprises a first tubing (16A) positioned on an upper end between the valve block front plate (14A) and the valve block middle plate (14B), the plurality of tubing (16) further comprises a second tubing (16B) positioned on an upper end between the valve block middle plate (14B) and the valve block rear plate (14C), the plurality of tubing (16) comprises a third tubing (16C) positioned on a lower end between the valve block front plate (14A) and the valve block middle plate (14B), the plurality of tubing (16) further comprises a fourth tubing (16D) positioned on a lower end between the valve block middle plate (14B) and the valve block rear plate (14C);

D) a plurality of pins (18) positioned through the valve block (14), the plurality of pins (18) comprises a first pin (18A) positioned from top to bottom through the valve block front plate (14A), the plurality of pins (18) further comprises a second pin (18B) positioned from top to bottom through the first tubing (16A) and the third tubing (16C), the plurality of pins (18) further comprises a third pin (18C) positioned from top to bottom through the second tubing (16B) and the fourth tubing (16D);

E) a stop plate (20) which comprises a stop plate central shaft recepticle (20AB) having a stop plate central shaft central opening (20AA) therethrough, the stop plate (20) further comprises a stop plate first threaded opening (20BA) and a stop plate second threaded opening (20BB);

F) a first front threaded fastener (36A) positioned through the front block first fastener opening (12BA) and the valve block front plate first fastener opening (14ABA) and the valve block middle plate first fastener opening and the valve block rear plate first fastener opening engaging the stop plate first threaded opening (20BA);

G) a second front threaded fastener (36B) positioned through the front block second fastener opening (12BB) and the valve block front plate second fastener opening (14ABB) and the valve block middle plate second fastener opening and the valve block rear plate second fastener opening engaging the stop plate second threaded opening (20BB);

H) a solenoid coil (22) rearwardly positioned adjacent the stop plate (20), the solenoid coil (22) comprises a solenoid coil central opening (22A) therethrough, the solenoid coil (22) further comprises a solenoid coil wire (22B) extending from a top end thereof;

I) a stop plate end cap (24) rearwardly positioned adjacent the solenoid coil (22), the stop plate end cap (24) comprises a stop plate end cap central opening (24A) therethrough and a stop plate end cap first fastener threaded opening (24BA) therethrough and a stop plate end cap second fastener threaded opening (24BB) therethrough;

J) a hollow plunger (28) rearwardly positioned engaging the stop plate end cap (24), the hollow plunger (28) is positioned within the solenoid coil central opening (22A);

K) a gasket (32) rearwardly positioned adjacent the hollow plunger (28), the gasket (32) comprises a gasket central opening (32A) therethrough and a gasket first fastener opening (32BA) and a gasket second fastener opening (32BB) therethrough and a gasket notch (32C) therethrough which functions to accept the solenoid coil wire (22B) therein;

L) a rear block (34) rearwardly positioned adjacent the gasket (32), the rear block (34) comprises a rear block central indent (34A) therein and a rear block first fastener opening (34BA) therethrough and a rear block second fastener opening (34BB) therethrough and a rear block notch (34C) which functions to accept the solenoid coil wire (22B) therein;

M) a housing (26) abutting the stop plate (20) on a front end and abutting the rear block (34) on a rear end, the housing (26) is positioned over the solenoid coil (22) and the stop plate end cap (24) and the gasket (32), the housing (26) further comprises a housing first pin spring opening (26AA) therethrough having a housing first pin spring (26A) positioned therein, the the housing (26) further comprises a housing second pin spring opening (26BA) therethrough having a housing second pin spring (26B) positioned therein;

N) a shaft (31) which comprises a shaft front end (31A) and a shaft rear end (31B), the shaft (31) further comprises a shaft front slot (31C) and a shaft middle slot (31D) and a shaft rear slot (31E) therein, the shaft (31) is positioned through the valve block front plate central opening (14AA) and the valve block middle plate central opening and the valve block rear plate central opening and the stop plate central shaft central opening (20AA) and the plunger (28) and the gasket central opening (32A), the shaft front end (31A) is positioned in the front block cylindrical indent (12A), the shaft rear end (31B) is positioned in the rear block central indent (34A), a nut (30) threadably engaged on the shaft rear end (31B);

O) a helical spring (13) is positioned on the shaft (31) between the front block (12) and the valve block front plate (14A);

P) a first rear threaded fastener (38A) is positioned through the gasket first fastener opening (32BA) and the rear block first fastener opening (34BA) engaging the stop plate end cap first fastener threaded opening (24BA); and Q) a second rear threaded fastener (38B) is positioned through the gasket second fastener opening (32BB) and the rear block second fastener opening (34BB) engaging the stop plate end cap second fastener threaded opening (24BB).

* * * * *